(12) United States Patent
Chen et al.

(10) Patent No.: US 8,381,568 B2
(45) Date of Patent: Feb. 26, 2013

(54) METHOD OF OBTAINING SAME WRENCH TORQUE BY CALIBRATION BY TESTING DIFFERENT FORCE EXERTION POINTS ON HAND GRIP OF ELECTRONIC TORQUE WRENCH AND ELECTRONIC TORQUE WRENCH THEREOF

(75) Inventors: Kung-Cheng Chen, Taichung Hsien (TW); Hui-Bing Lin, Taichung Hsien (TW)

(73) Assignee: Xiamen United Trade Electronic Co., Ltd., Xiamen (CN)

( * ) Notice: Subject to any disclaimer, the term of this patent is extended or adjusted under 35 U.S.C. 154(b) by 421 days.

(21) Appl. No.: 12/876,096

(22) Filed: Sep. 3, 2010

(65) Prior Publication Data

US 2012/0055227 A1 Mar. 8, 2012

(51) Int. Cl.
G01L 25/00 (2006.01)
G01L 5/24 (2006.01)

(52) U.S. Cl. ......................... 73/1.12; 73/1.11; 73/862.22

(58) Field of Classification Search .......... 73/1.11–1.12, 73/862.21–862.23
See application file for complete search history.

(56) References Cited

U.S. PATENT DOCUMENTS

| | | | | |
|---|---|---|---|---|
| 3,868,872 A | * | 3/1975 | Wing | 81/470 |
| 4,558,601 A | * | 12/1985 | Stasiek et al. | 73/862.23 |
| 4,976,133 A | * | 12/1990 | Pohl | 73/1.11 |
| 5,176,050 A | * | 1/1993 | Sauer et al. | 81/471 |
| 5,569,866 A | * | 10/1996 | Allison | 73/862.626 |
| 6,144,891 A | * | 11/2000 | Murakami et al. | 700/108 |
| 6,318,189 B1 | * | 11/2001 | Donaldson | 73/862.335 |
| 7,093,477 B2 | * | 8/2006 | Herbold et al. | 73/1.11 |
| 2011/0100170 A1 | * | 5/2011 | Chiapuzzi | 81/479 |
| 2012/0031161 A1 | * | 2/2012 | Hsieh | 73/1.12 |
| 2012/0055228 A1 | * | 3/2012 | Herbold | 73/1.12 |
| 2012/0132042 A1 | * | 5/2012 | Bruce | 81/479 |
| 2012/0143552 A1 | * | 6/2012 | Cho et al. | 702/104 |

FOREIGN PATENT DOCUMENTS

EP 210892 A1 * 2/1987

* cited by examiner

Primary Examiner — Thomas P Noland

(57) ABSTRACT

An electronic torque wrench calibration method includes providing test rod for simulating wrench body and support plate for simulating hand grip wherein on either side of the support plate there are provided at least two test points and an intermediate reference point; securing sensor to a stress gauge; placing two weights on the reference points and setting a count to one; recording torque as standard value; placing a weight on a respective one of the test points; recording torque as test value; comparing the test value with the standard value and obtaining an error; increasing bores of the adjustment holes if the error is greater than one prior to looping back to weight placing step; and ending the method by determining whether a predetermined count has been reached, and otherwise placing the weight on another respective one of the test points prior to looping back to test value recordation step.

5 Claims, 6 Drawing Sheets

METHOD OF OBTAINING SAME WRENCH TORQUE BY CALIBRATION BY TESTING DIFFERENT FORCE EXERTION POINTS ON HAND GRIP OF ELECTRONIC TORQUE WRENCH AND ELECTRONIC TORQUE WRENCH THEREOF

BACKGROUND OF THE INVENTION

1. Field of Invention

The invention relates to torque calibration techniques and more particularly to a method of obtaining same wrench torque by calibration by testing different force exertion points on hand grip of an electronic torque wrench and an electronic torque wrench therefore.

2. Description of Related Art

Wrench is a tool used to provide grip and mechanical advantage in applying torque to turn objects (e.g., rotary fasteners such as nuts and bolts).

As sufficient torque is applied to the head of a fastener, the fastener is secured. However, it is also that overstressed fasteners can be broken whereas under-stressed fasteners can lead to joint failure, leakage, etc. Thus, indication of torque exerted on a workpiece (e.g., precise mechanism, medical tool, etc.) by a wrench by means of a digital display is desirable.

A great array of electronic torque wrenches for satisfying above need is commercially available. Typically, exerted torque indicated in the form of digits can be shown on a display of the wrench in use. However, it is found that different torques are applied to a workpiece when the gripping positions of the hand grip of a torque wrench are different. That is, there is an error between the preset torque value and actual one. It is undesired for such workpieces (e.g., precise mechanism, medical tool, etc.) if the error is greater than the maximum error since high precision is always desired. Thus, the need for improvement still exists.

SUMMARY OF THE INVENTION

It is therefore one object of the invention to provide in an electronic torque wrench including a wrench head for engaging a workpiece, a sensor having a forward end secured to the wrench head, an elongated wrench body having a forward end secured to a rear end of the sensor, a battery powered display mounted on the wrench body, a hand grip having a forward end secured to a rear end of the wrench body, two deformation members disposed on two opposite sides of the sensor respectively, and first and second adjustment holes in the sensor, the first and second adjustment holes being in communication each other, a method of obtaining same wrench torque by calibration by testing a plurality of different force exertion points on the hand grip comprising steps of (a) providing a calibration device comprising a test rod for simulating the wrench body, and a support plate on a rear end of the test rod, the support plate being for simulating the hand grip wherein on either side of top of the support plate, there are provided at least two test points and an intermediate reference point, and the sensor is secured to a forward end of the test rod; (b) securing a forward end of the sensor to a stress gauge which measures a torque value obtained by converting deformations of the deformation members on the sensor; (c) placing two weights on the reference points and setting a count to one; (d) recording a torque value obtained by and shown on the stress gauge as a standard torque value; (e) placing a weight on a respective one of the test points on either side of the support plate; (f) recording a torque value obtained by and shown on the stress gauge as a test torque value; (g) comparing the test torque value with the standard torque value, obtaining a difference therebetween as an error, and determining whether the error is greater than one or not; (h) increasing bores of the first and second adjustment holes if the error is greater than one prior to looping back to step (e); (i) comparing the count with a predetermined count and ending the method if the count is equal to the predetermined count; and w placing the weight on another respective one of the test points on either side of the support plate and incrementing the count by one prior to looping back to step (f).

Another object of the invention is to provide an electronic torque wrench comprising a wrench head for engaging a workpiece; a sensor having a forward end secured to the wrench head and comprising first and second adjustment holes, the first and second adjustment holes being in communication each other; an elongated wrench body having a forward end secured to a rear end of the sensor; a battery powered display mounted on the wrench body; a hand grip having a forward end secured to a rear end of the wrench body; and two deformation members disposed on two opposite sides of the sensor respectively, wherein bores of the first and second adjustment holes have been calibrated by a calibration device so that same torque can be exerted on the workpiece by the wrench head.

The above and other objects, features and advantages of the invention will become apparent from the following detailed description taken with the accompanying drawings.

DETAILED DESCRIPTION OF THE INVENTION

Figure 1:
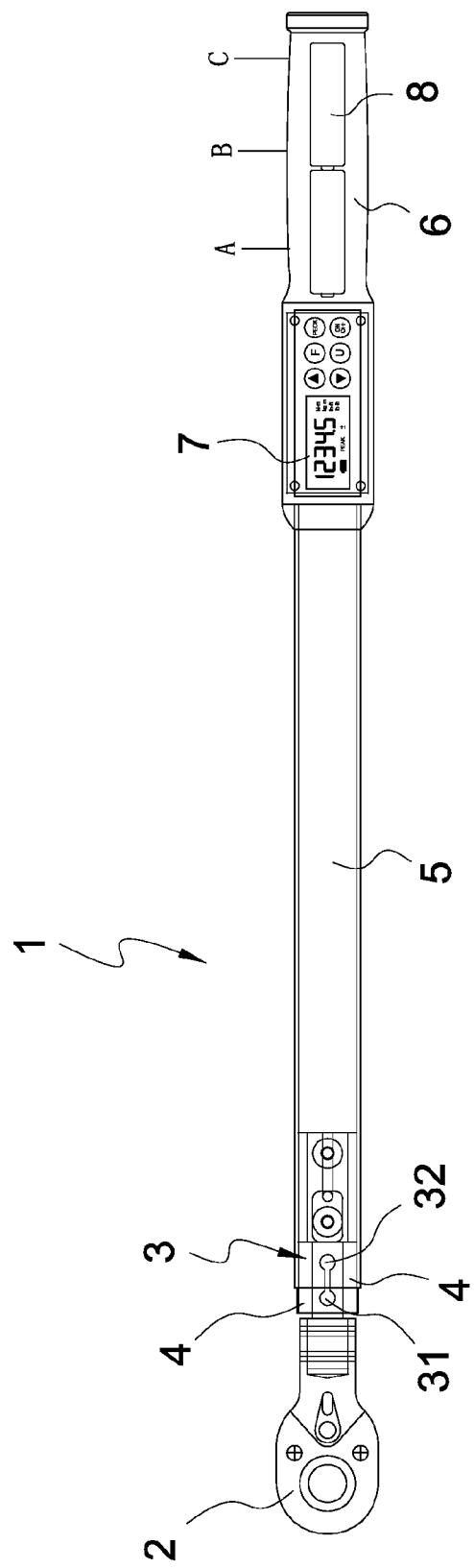
FIG. 1 is a top plan view of an electronic torque wrench according to the invention.
Figure 2:
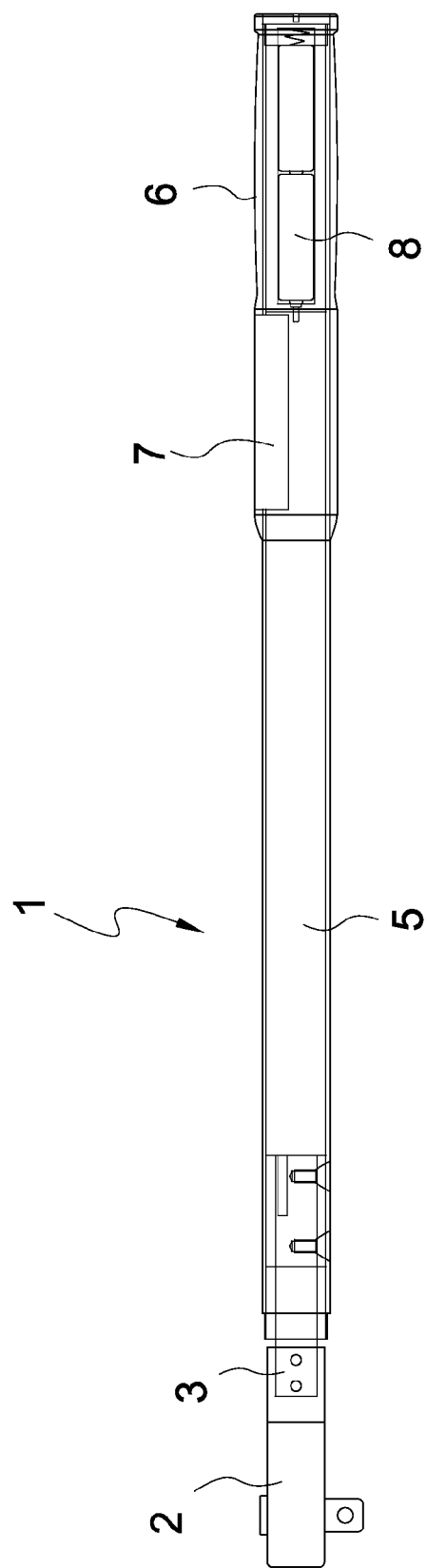
FIG. 2 is a side elevation of the electronic torque wrench.
Figure 3:
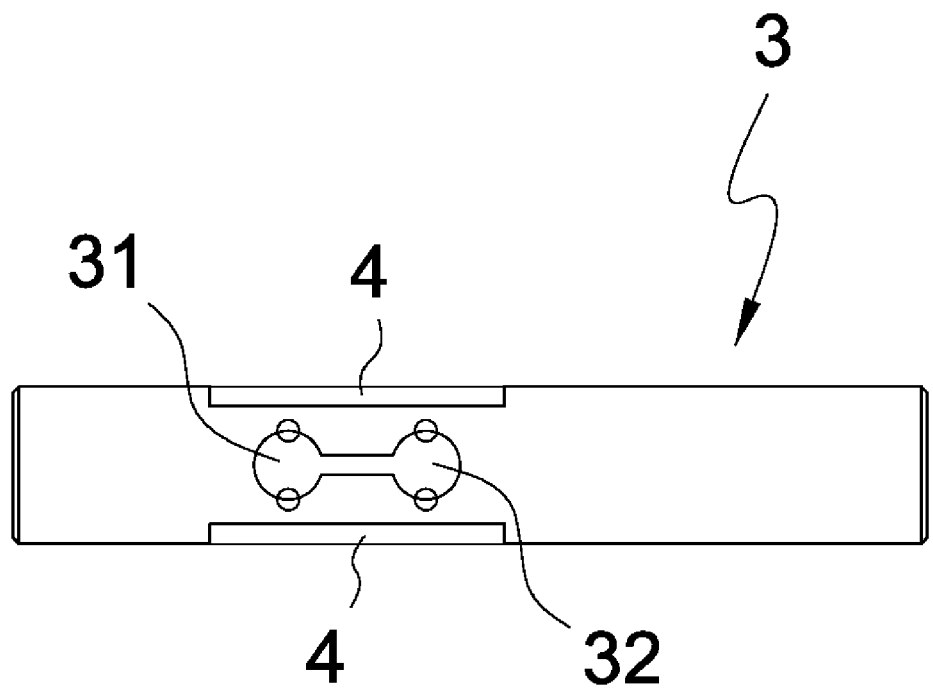
FIG. 3 is a top plan view of the sensor and the deformation members of FIG. 1.

Referring to FIGS. 1 to 3, an electronic torque wrench 1 in accordance with the invention comprises the following components as discussed in detail below.

A wrench head 2 is for engaging a workpiece (not shown). A sensor 3 has a forward end secured to the wrench head 2. An elongated wrench body 5 has a forward end secured to a rear end of the sensor 3. A display (e.g., liquid crystal display) 7 is mounted on a rear portion of the wrench body 5. A hand grip 6 has a forward end secured to a rear end of the wrench body 5. A plurality of batteries 8 are installed in a battery compartment of the hollow hand grip 6. The batteries 8 can supply power to the display 7 for its normal operation.

Two deformation members 4 are provided on two opposite sides of the sensor 3 respectively. The sensor 3 has first and second adjustment holes 31, 32 in communication each other. The bores of the first and second adjustment holes 31, 32 have been calibrated by a calibration device as detailed later. Thus, same torque can be exerted on a workpiece by the wrench head 2 even when the hand grips different points (e.g., force exertion points A, B and C shown in FIG. 1) on the hand grip 6.

Figure 4:
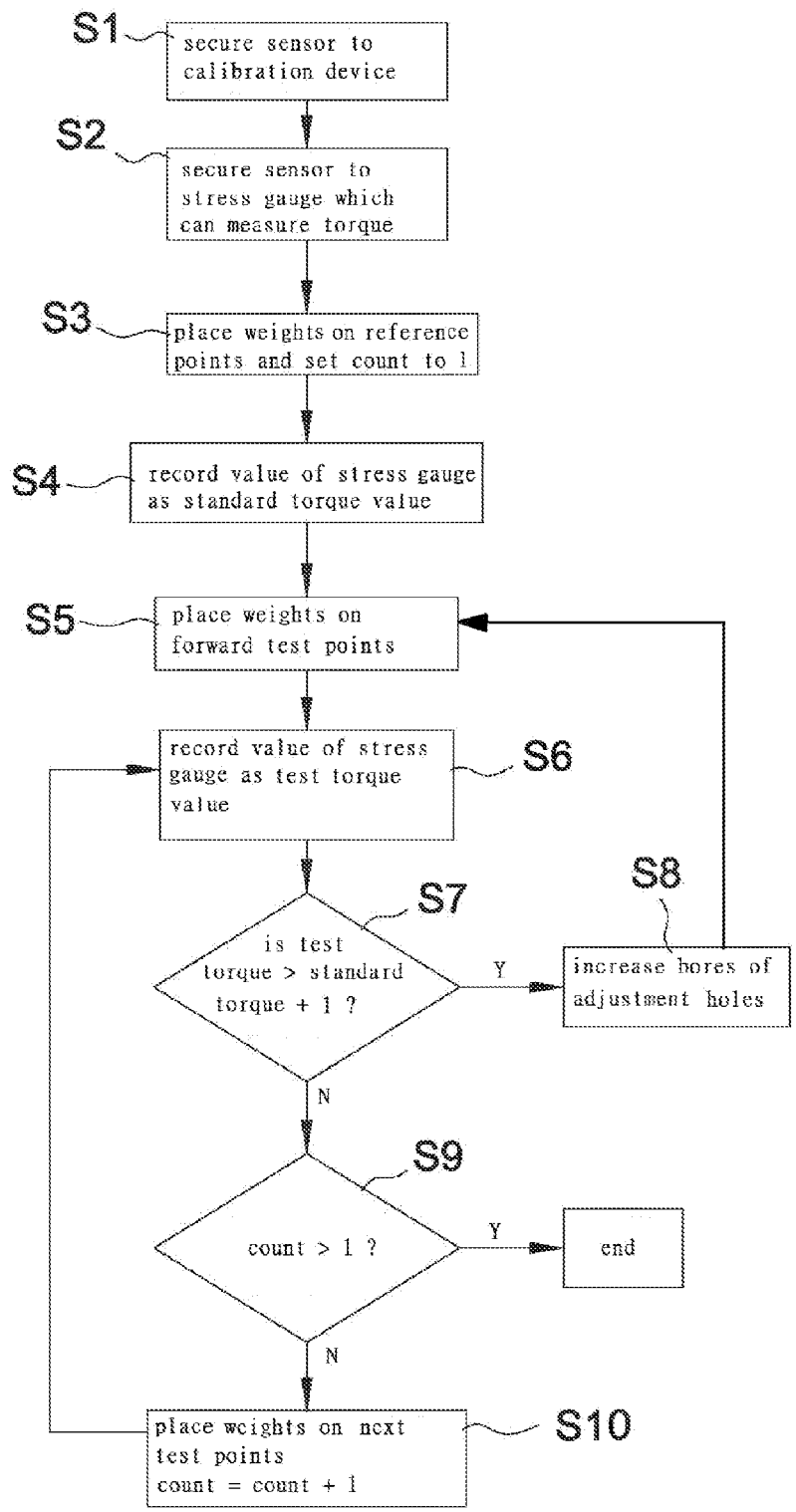
FIG. 4 is a is flowchart illustrating a method of obtaining same wrench torque by calibration by testing different force exertion points on the hand grip of the electronic torque wrench according to the invention.
Figure 5:
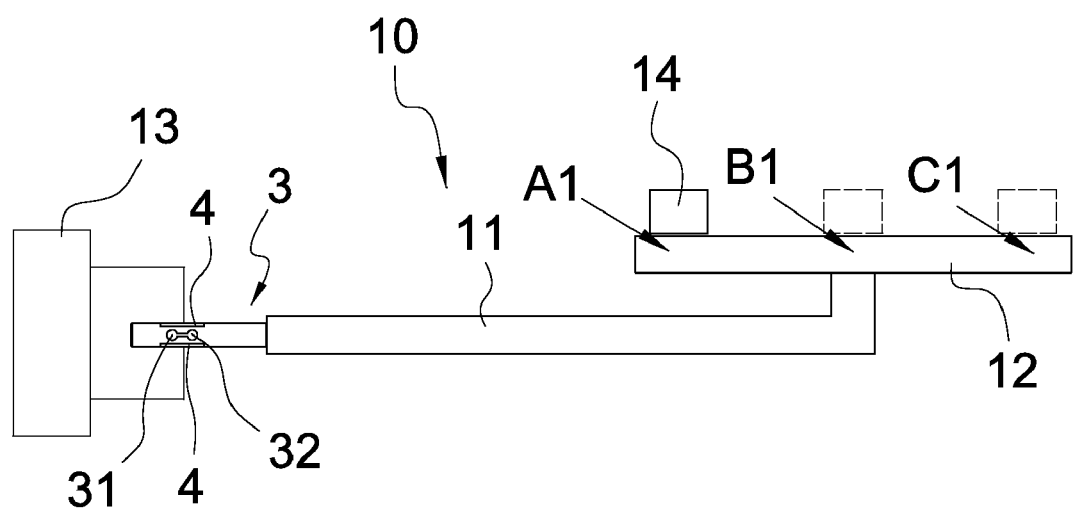
FIG. 5 is a side elevation showing a calibration device, the sensor, and the deformation member for the calibration.
Figure 6:
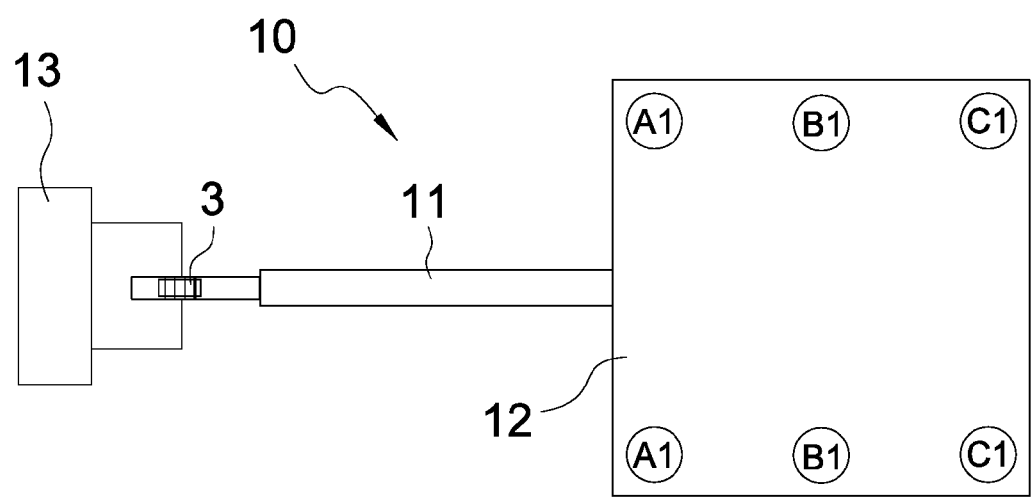
FIG. 6 is a top plan view of FIG. 5.

Referring to FIGS. 4 to 6, a method of obtaining same wrench torque by calibration by testing different force exertion points on a hand grip of an electronic torque wrench discussed above is illustrated.

In the method of FIG. 4, in step S1 a calibration device 10 comprises a test rod 11 for simulating the wrench body 5, and a support plate 12 on a rear end of the test rod 11, the support plate 12 being for simulating the hand grip 6. On either side of the top surface of the support plate 12, there are provided two test points A1 and C1 and an intermediate reference point B1. The sensor 3 is secured to a forward end of the test rod 11.

In step S2, the forward end of the sensor 3 is secured to a stress gauge 13 which can measure a torque value obtained by converting deformations of the deformation members 4 on the sensor 3.

In step S3, two weights 14 are placed on the intermediate reference points B1 and count n is initialized (i.e., count equal to one).

In step S4, torque value obtained by and shown on the stress gauge 13 is recorded as a standard torque value.

In step S5, two weights 14 are placed on the forward test points A1.

In step S6, torque value obtained by and shown on the stress gauge 13 is recorded as test torque value.

In step S7, compare the test torque value with the standard torque value and obtain a difference therebetween as error so as to determine whether the error is greater than one or not.

In step S8, increase bores of the first and second adjustment holes 31, 32 if the error is greater than one prior to looping back to step S5. Otherwise, the method goes to next step S9 (i.e., the error being less than or equal to one).

In step S9, count n is compared with a preset maximum count (e.g., two in this embodiment). The method ends successfully if the count n is equal to two. Otherwise, the method goes to step S10.

In step S10, take the weights 14 to test points C1 and increment n by one prior to looping back to step S6.

Preferably, the support plate 12 is a rectangle and four test points A1, C1 are on four corners of the support plate 12. Test points A1 proximate the test rod 11 correspond to force exertion point A on the hand grip 6 of the electronic torque wrench 1. Test points C1 distal the test rod 11 correspond to force exertion point C on the hand grip 6 of the electronic torque wrench 1. Test points B1 between test points A1 and C1 correspond to force exertion point B on the hand grip 6 of the electronic torque wrench 1.

Preferably, but not limited to, the increase of the bores of the first and second adjustment holes 31, 32 is done by grinding the bores thereof by means of a file.

As a result, after implementing the method substantially same torque value can be obtained by calibrating the sensor 3 when the hand grips different force exertion points A, B and C on the hand grip 6. The obtained torque value will be shown as digital torque value after being converted by a processor associated with the display 7. Therefore, torque error is decreased to a desired minimum when using the electronic torque wrench 1 to turn a fastener.

While the invention has been described in terms of preferred embodiments, those skilled in the art will recognize that the invention can be practiced with modifications within the spirit and scope of the appended claims.

What is claimed is:

1. A method of obtaining same wrench torque by calibration by testing a plurality of different force exertion points on the hand grip of an electronic torque wrench, the electronic torque wrench including a wrench head for engaging a workpiece, a sensor having a forward end secured to the wrench head, an elongated wrench body having a forward end secured to a rear end of the sensor, a battery powered display mounted on the wrench body, a hand grip having a forward end secured to a rear end of the wrench body, two deformation members disposed on two opposite sides of the sensor respectively, and first and second adjustment holes in the sensor, the first and second adjustment holes being in communication each other, the method comprising steps of:

(a) providing a calibration device comprising a test rod for simulating the wrench body, and a support plate on a rear end of the test rod, the support plate being for simulating the hand grip wherein on either side of top of the support plate there are provided at least two test points and an intermediate reference point, and the sensor is secured to a forward end of the test rod;

(b) securing a forward end of the sensor to a stress gauge which measures a torque value obtained by converting deformations of the deformation members on the sensor;

(c) placing two weights on the reference points and setting a count to one;

(d) recording a torque value obtained by and shown on the stress gauge as a standard torque value;

(e) placing a weight on a respective one of the test points on either side of the support plate;

(f) recording a torque value obtained by and shown on the stress gauge as a test torque value;

(g) comparing the test torque value with the standard torque value, obtaining a difference therebetween as an error, and determining whether the error is greater than one or not;

(h) increasing bores of the first and second adjustment holes if the error is greater than one prior to looping back to step (e);

(i) comparing the count with a predetermined count and ending the method if the count is equal to the predetermined count; and (j) placing the weight on another respective one of the test points on either side of the support plate and incrementing the count by one prior to looping back to step (f).

2. The method of claim 1, wherein the support plate is a rectangle, the at least two test points on either side of the support plate comprise two test points, wherein the four test points are on four corners of the support plate respectively.

3. The method of claim 1, wherein the bore increasing of each of the first and second adjustment holes is done by grinding by means of a file.

4. An electronic torque wrench comprising:

a wrench head for engaging a workpiece;

a sensor having a forward end secured to the wrench head and comprising first and second adjustment holes, the first and second adjustment holes being in communication each other;

an elongated wrench body having a forward end secured to a rear end of the sensor;

a battery powered display mounted on the wrench body;

a hand grip having a forward end secured to a rear end of the wrench body; and two deformation members disposed on two opposite sides of the sensor respectively, wherein bores of the first and second adjustment holes have been calibrated by a calibration device so that same torque can be exerted on the workpiece by the wrench head.

5. The electronic torque wrench of claim 4, wherein the calibration device comprises a test rod for simulating the wrench body, and a support plate on a rear end of the test rod, the support plate being for simulating the hand grip, and wherein on either side of top of the support plate, there are provided at least two test points and an intermediate reference point, and the sensor is secured to a forward end of the test rod.

* * * * *